United States Patent
Denham

(10) Patent No.: US 9,154,711 B2
(45) Date of Patent: Oct. 6, 2015

(54) INFRARED THERMAL IMAGING SYSTEM AND METHOD

(71) Applicant: Raytheon Company, Waltham, MA (US)

(72) Inventor: Martin S. Denham, Bend, OR (US)

(73) Assignee: RAYTHEON COMPANY, Waltham, MA (US)

( * ) Notice: Subject to any disclaimer, the term of this patent is extended or adjusted under 35 U.S.C. 154(b) by 365 days.

(21) Appl. No.: 13/688,353

(22) Filed: Nov. 29, 2012

(65) Prior Publication Data

US 2014/0146180 A1    May 29, 2014

(51) Int. Cl.
*H04N 5/30* (2006.01)
*H04N 5/33* (2006.01)
*H04N 5/365* (2011.01)

(52) U.S. Cl.
CPC . *H04N 5/33* (2013.01); *H04N 5/365* (2013.01)

(58) Field of Classification Search
None
See application file for complete search history.

(56) References Cited

U.S. PATENT DOCUMENTS

| | | | |
|---|---|---|---|
| 5,811,808 A | 9/1998 | Cannata et al. | |
| 6,028,309 A | 2/2000 | Parrish et al. | |
| 6,610,984 B2 | 8/2003 | Knauth et al. | |
| 6,690,014 B1 | 2/2004 | Gooch et al. | |
| 7,898,571 B1 | 3/2011 | Peterson | |
| 2009/0115717 A1* | 5/2009 | Sagawa et al. | 345/100 |
| 2010/0127174 A1* | 5/2010 | Tener et al. | 250/339.02 |
| 2012/0199689 A1 | 8/2012 | Burkland | |
| 2012/0211648 A1* | 8/2012 | Linsacum et al. | 250/252.1 |
| 2013/0321639 A1* | 12/2013 | Kuiken et al. | 348/164 |
| 2014/0061833 A1* | 3/2014 | Knight et al. | 257/432 |

FOREIGN PATENT DOCUMENTS

| | | |
|---|---|---|
| EP | 2393281 A2 | 12/2011 |
| WO | 9835212 A1 | 8/1998 |

OTHER PUBLICATIONS

Notification of Transmittal of the International Search Report and the Written Opinion of the International Searching Authority from corresponding PCT/US2013/069410 dated Jul. 28, 2014.

* cited by examiner

*Primary Examiner* — William C Vaughn, Jr.
*Assistant Examiner* — Eileen Adams
(74) *Attorney, Agent, or Firm* — Lando & Anastasi, LLP

(57) ABSTRACT

Systems and methods for configuring an infrared thermal imaging system using a video interface of an electronic device, such as a microcontroller, for example, for sending commands and control information. In one example a an infrared thermal imaging system includes a focal plane array (FPA) of infrared detectors, the FPA being configured to generate an output signal in response to infrared radiation impinging thereupon, read out integrated circuitry (ROIC) operatively coupled to the FPA, and a microcontroller having at least one video display interface operatively coupled to the ROIC, the microcontroller being configured to send data to the ROIC via the at least one video display interface, the data including command data.

15 Claims, 2 Drawing Sheets

INFRARED THERMAL IMAGING SYSTEM AND METHOD

FEDERALLY SPONSORED RESEARCH

This invention was made with government support under Contract No. HR0011-11-C-0125 awarded by DARPA/CMO. The U.S. government has certain rights in this invention.

BACKGROUND

A microbolometer is a type of uncooled sensor for detecting infrared (IR) radiation. Conventional microbolometers include a focal plane array (FPA) of detector elements, or pixels, each of which measures a change in electrical resistance while being exposed to thermal radiation. The change in resistance of pixels is converted into an image representing a two-dimensional temperature histogram at the scene focal point. Materials and processes currently used to produce uncooled IR detectors have substantial manufacturing variation, and inherent non-uniformities in pixel responsivity and offset often exist within conventional focal plane arrays. In order to compensate for wide manufacturing variation, non-uniformity correction (NUC) settings, also referred to as coarse-level equalization (CLE) settings, (per pixel) are typically applied to the imaging array, prior to integrating an image, (over a frame period) to compensate for these variations For each video frame, a binary NUC value, per pixel, is transmitted from a host electronics circuit to the imaging array. As such, the transmission of NUC terms from the host to the imaging array has the properties of a video stream. Also, for each video frame, the results of imaging (called "imaging pixels") are transmitted from the imaging array back to the host. Thus, there exists a persistent video transmission from the host to the FPA and a corresponding video transmission from the FPA to the host.

A typical microbolometer FPA requires control information. Typically, the control information is transmitted at the beginning of each frame. Control information is digital (binary) information that controls aspects of NUC application, windowing sizing, bias control information, video output formatting, and so forth. Often, this control information is transmitted serially, through a serial port.

As part of the progression to lower power and lower cost, microprocessor-based host electronics are being developed for microbolometer imagers. Newer microprocessor-based host electronics can reduce power and cost by using standardized formats and dedicated graphics processing and image process hardware. Such hardware operates on standardized interfaces.

SUMMARY OF THE INVENTION

Aspects and embodiments are directed to systems and methods for infrared thermal imaging, for example, configuring an infrared thermal imaging system by using a video interface of a microcontroller for sending commands and control information. In at least one embodiment, an infrared thermal imaging system includes a focal plane array (FPA) of infrared detectors. The FPA is configured to generate an output signal in response to impinging infrared radiation. The system further includes read-out integrated circuitry (ROIC) operatively coupled to at least one video display interface of a microcontroller.

According to one embodiment, an infrared thermal imaging system comprises a focal plane array (FPA) of infrared detectors, the FPA being configured to generate an output signal in response to infrared radiation impinging thereupon, read out integrated circuitry (ROIC) operatively coupled to the FPA, and an electronic device, such as a microcontroller, for example, having at least one video display interface operatively coupled to the ROIC, the electronic device being configured to send data to the ROIC via the at least one video display interface, the data including command data.

In one example the command data comprises control information. The data may further include non-uniformity correction terms for correcting the output signal of the FPA. In one example the non-uniformity correction terms are formatted into lines of video data and empty lines. In another example the command data is written into the empty lines. The empty lines may include horizontal blanking lines, and the command data may be written into the horizontal blanking lines. In one example the output signal of the FPA includes an analog signal, and wherein the ROIC includes an analog-to-digital converter configured to convert the analog signal into a digital video signal. The microcontroller (or other electronic device) may be further configured to receive the digital video signal via the at least one video display interface.

Another embodiment is directed to a method of operating an infrared thermal imaging system having a focal plane array (FPA) of infrared detectors, read out integrated circuitry (ROIC) operatively coupled to the FPA, and an electronic device, such as a microcontroller, for example, including at least one video display interface operatively coupled to the ROIC. The method may comprise sending data from the electronic device to the ROIC via the at least one video display interface, the data including command data, and sending the data from the ROIC to the electronic device via the at least one video display interface.

In one example of the method the command data comprises control information. The data may further comprise non-uniformity correction terms for correcting an output signal of the FPA. The method may further comprise formatting the non-uniformity correction terms into lines of video data and empty lines. In one example the method further comprises writing the command data into the empty lines. The empty lines may include horizontal blanking lines, and the method may further comprise writing the command data into the horizontal blanking lines. In another example in which an output of the FPA includes an analog signal, the method further comprises converting, by the ROIC, the analog signal into a digital video signal, and receiving, by the microcontroller (or other electronic device), the digital video signal via the at least one video display interface.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
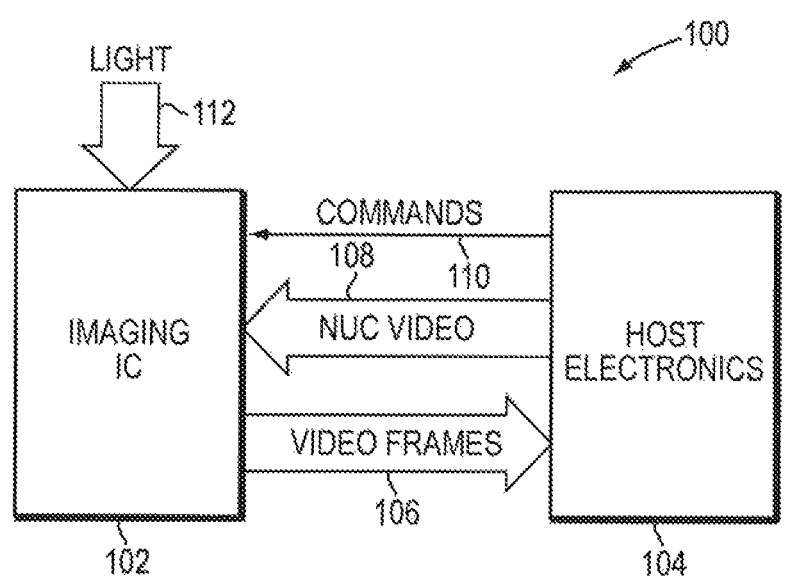
FIG. 1 is a block diagram of one example of an infrared thermal imaging system.

Conventional uncooled microbolometer arrays have used field programmable gate arrays (FPGAs) and non-standard video and control streams to perform control and imaging processing. In contrast to these legacy FPGAs, commercially available processors for low power operation have been developed. Some of these processors use standardized interfaces for complementary metal-oxide-semiconductor (CMOS) cameras, specialized subsystems for graphics and drawing, and hardware to assist with the processing of video streams. Dedicated graphics and image processing hardware is often more power and speed efficient than legacy FPGA solutions. Such processors may also provide access to other functions, including video encoding (e.g., H.264), streaming algorithms for transferring video data over IP networks, and web server implementations for microbolometer configuration and control. In accord with one embodiment, a microprocessor having at least one video display interface (e.g., a bi-directional parallel data interface) can be configured to send data, including non-uniformity correction (NUC) terms, to the FPA/ROIC via the video display interface, as discussed in more detail below. In this manner, the microprocessor can perform at least some of the image preprocessing functions that, in prior techniques, were typically performed by an FPGA. As will be appreciated by those skilled in the art, given the benefit of this disclosure, FPGA and microcontroller products are evolving and newer FPGA integrated circuits with embedded microcontrollers and standardized interfaces are blurring the distinction between legacy FPGAs and microcontrollers. Accordingly, aspects and embodiments discussed herein may be applied to any of numerous electronics solutions, including FPGAs.

Processor subsystems feature standardized interfaces which extends their applicability to a wide range of electronics. Such processors can include standard serial interfaces such as I2C and SPI, as examples. Unfortunately, these standard serial interfaces have two important drawbacks for the microbolometer imager application. First, they operate slowly and asynchronously to the video interfaces which renders them much less useful for this application. Second, the design and qualification of a standard serial interface adds cost to product development. Thus, in the migration from FPGA-based host electronics to processor-subsystem host electronics (featuring standardized interfaces), a solution is needed for transmitting a control stream from the host to the FPA, such transmission formerly being a serialized interface.

Aspects and embodiments are directed to systems and methods that may provide such a solution. In some embodiments, an infrared thermal imaging system includes an imaging integrated circuit (IC) and a host circuit, in which the host circuit sends data, including NUC terms, to the imaging IC via the video display interface. In some examples the NUC data is sourced from thermal page tables in a read-only memory (ROM) device, such as a flash memory device, for example. As the NUC data is transmitted via the video display interface, the NUC data is formatted similar to video data, including empty lines and empty regions of lines that include no data. Such empty video regions are often referred to as vertical blanking and horizontal blanking, respectively. The host circuit also sends command data to the imaging IC. The command data is transmitted to the imaging IC using empty lines (that is, vertical blanking regions) in the NUC data. Thus, the design, manufacture, and testing of the imaging IC can be simplified, as a separate serial port or other command port is no longer needed for the command data.

Aspects and embodiments are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of one example of an infrared thermal imaging system 100. The infrared thermal imaging system 100 includes an imaging integrated circuit (IC) 102 and a host circuit 104. The imaging IC 102 generates image data based on infrared light and transmits the image data to the host circuit 104. The image data is transmitted through a video output port as video output data 106. The host circuit 104 provides per pixel NUC data 108 to the imaging IC 102 through a video input port on the imaging IC 102. The host circuit 104 also provides command data 110 to the imaging IC 102 through a command port, such as a serial port, on the imaging IC 102. A more detailed description of an example infrared thermal imaging system 100 can be found in co-pending commonly-owned U.S. patent application Ser. No. 13/482,194 filed on May 29, 2012 and titled "INFRARED THERMAL IMAGING SYSTEM AND METHOD," which is hereby incorporated herein by reference in its entirety.

Command data 110 can include commands and control information. Commands include any instructions that can be executed by the imaging IC 102. Control information includes any data that includes information that can be used to configure parameters on the imaging IC 102. Control information can include, for example, biasing information for analog circuits, integration time information, timing information, and windowing information. The host circuit 104 provides the command data 110 via a command port. The command port can be, for example, a serial port transmitting between 128 and 256 bits of command data. The host circuit 104 and the imaging IC 102 can have corresponding command ports to provide and receive command data 110, respectively.

Figure 2:
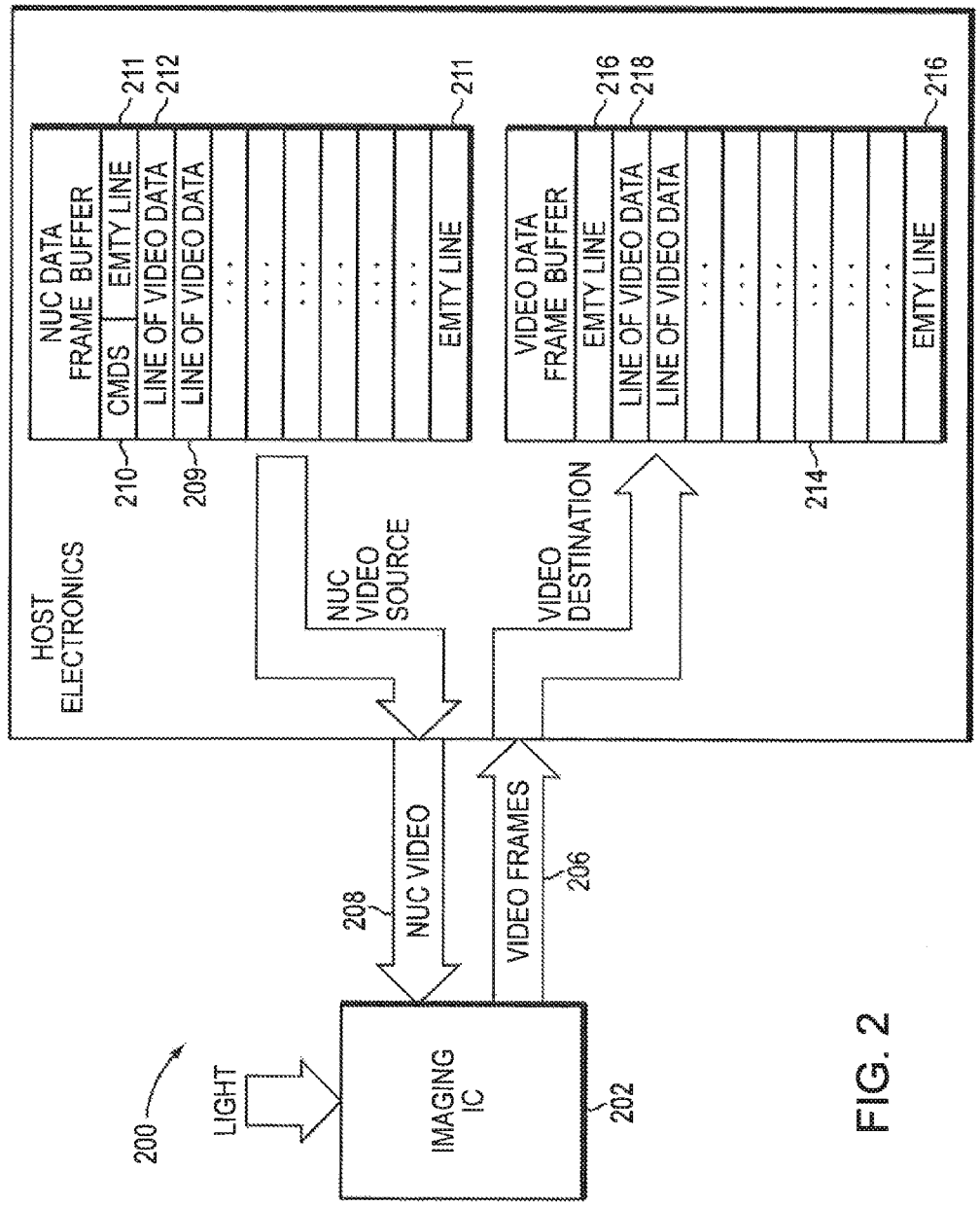
FIG. 2 is a block diagram of one example of an infrared thermal imaging system in accordance with aspects of the invention.

FIG. 2 is a block diagram of one example of an infrared thermal imaging system 200, according to one embodiment. The infrared thermal imaging system 200 includes an imaging IC 202 and a host circuit 204. As described in further detail below, the imaging IC 202 generates image data based on infrared light and transmits the image data to the host circuit 204. The image data is transmitted through a video output port as video output data 206. The host circuit 204 provides NUC data 208 to the imaging IC 202 through a video input port on the imaging IC 202. The host circuit 204 also provides command data 210 to the imaging IC 202. The host circuit 204 provides the command data 210 using the video input port on the imaging IC 202. Thus, a separate dedicated command port is not needed on the imaging IC 202.

The imaging IC 202 can be a monolithic or hybridized integrated circuit. For example, the imaging IC 202 can be manufactured using one sequence of CMOS manufacturing steps. Alternatively, the imaging IC 202 can be an ROIC bonded to a circuit card assembly including photo-diodes. The imaging IC 202 implements uncooled thermal imaging. In some embodiments, the uncooled thermal imaging is implemented by construction of a two-dimensional (2D) focal plane array (FPA) imager core. In one example, a two-dimensional array of vanadium oxide bolometers is manufactured on top of the FPA. In some embodiments, a vanadium oxide bolometer is manufactured for each pixel of the FPA.

The bolometer is a resistor structure that modulates a bias current in response to infrared (IR) photons, for example, long-wave infrared (LWIR) photons. LWIR photons can be emitted by objects as thermal radiation. The imaging IC 202 integrates the bias current through the bolometer to produce a post-integration voltage. The post-integration voltage is dependent on the number of LWIR photons received by the bolometer during an image capture time. In some examples, as each pixel has a bolometer, the bolometers measure LWIR photons received by each FPA pixel. The voltage data can be transmitted to the host circuit 204. Alternatively or additionally, the voltage data can be digitized into binary values on the imaging IC 202 and transmitted to the host circuit 204. In some embodiments, the imaging IC 202 transmits the voltage data to the host circuit 204 through a video output port as output video data 206.

In some embodiments, the host circuit 204 includes a combination of discrete electronics, a circuit board, a microprocessor, an FPGA, and other appropriate components such as a video processing unit, a graphics processing unit, a single instruction, multiple data digital signal processor (SIMD DSP), and internal memory. The host circuit 204 receives output video data 206 from the imaging IC 202 via an input video port on the host circuit 204. In some embodiments, the host circuit 204 stores the received output video data 206 in the internal memory. For example, the internal memory can be a static random-access memory (SRAM). The host circuit 204 temporarily stores the output video data 206 in a video data frame buffer 214, which can be implemented as a contiguous set of memory locations in the SRAM. In some embodiments, the output video data 206 is formatted in lines. The lines are rows of data, each row containing binary data for a series of pixels. Each pixel corresponds to a column in the FPA. The output video data 206 can also include empty lines 216 containing no data. The empty lines 216 can include leading or trailing lines, placed before or after the lines of video data 218, respectively. The empty lines 216 can include vertical blanking lines or horizontal blanking portions of a line. The horizontal blanking lines are empty columns of data within the lines.

The host circuit 204 also provides NUC data 208 to the imaging IC 202. The NUC data 208 includes correction coefficients that can be applied to the biasing current of the bolometers during the integration phase of the image capture time. In some embodiments, the NUC data 208 is formatted similar to video data and received by the imaging IC 202 on an input video port. The NUC data 208 is temporarily stored in a NUC data frame buffer 209 before it is transmitted to the imaging IC 202. In alternate embodiments, NUC data can be sourced from a Read-Only Memory (ROM) source and correspond to pages which are accessed according to indexed junction temperatures of imaging IC 202. The NUC data frame buffer 209 can implemented as a contiguous set of memory locations in the same SRAM as the video data frame buffer 214 or in a different SRAM. Similar to the output video data 206, the NUC data 208 can be formatted in lines of video data 212, including empty lines 211. The command data 210 can be placed into the empty lines 211 and transmitted via the output video port on the host circuit 204 to the input video port on the imaging IC 202. In some embodiments, the command data 210 is placed into vertical blanking lines. Alternatively or additionally, the command data 210 can be written into horizontal blanking regions. In some embodiments, the command data 210 is written into leading empty lines 211 that come before the lines of video data 209 in a block or segment of data. Alternatively or additionally, the command data 210 can be written into trailing empty lines 211.

In some embodiments, as the empty lines 211 now also contain the command data 210 and are not completely blank lines, the imaging IC 202 may be programmed to treat the command data as empty lines for the purposes of the NUC data 208. For example, a sequence of bits before each empty line may signify that data contained in the line is command data 210. Alternatively or additionally, the empty lines may recur at a known frequency. The imaging IC 202 may then read the command data 210 and execute any commands or configure any control information as appropriate. In some embodiments, the host circuit 204 sends command data 210 to the imaging IC 202 in NUC data 208 that is empty. For example, if the imaging IC 202 is not in an image capture mode, the imaging IC 202 may not need any correction data. The host circuit 204 may nevertheless send empty NUC data 208 for the purpose of providing the command data 210. In some embodiments, the NUC data 208 includes NUC information to be used during an image capture as well as command data 210. In some embodiments the empty lines 211 may remain empty 211, for example, when the host circuit 204 is providing NUC data 208 for image capture but no command data 210.

In some embodiments, as the command data 210 is written into a video data format, the host circuit 204 includes an option to output the command data 210 for display, handshake, or conveying ROIC status. The command data may be displayed graphically, textually, as numbers, or in some other appropriate manner of display. In this way, the command data 210 may be checked and tested apart from an imaging IC 202.

As described above, command data is transmitted from a host circuit to an imaging IC using a video display interface. The command data may be written in empty lines of non-uniformity correction NUC data. As the NUC data is transmitted via the video display interface, the NUC data is formatted similar to video data, including empty lines that contain no data. The empty lines can be utilized by the host circuit to transmit command data, thus obviating a need for a separate port for transmitting command data.

Having described above several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. An infrared thermal imaging system comprising:
 a focal plane array (FPA) of infrared detectors, the FPA being configured to generate an output signal in response to infrared radiation impinging thereupon;

read out integrated circuitry (ROIC) operatively coupled to the FPA and configured to receive the output signal and generate an image signal based on the output signal; and an electronic device having at least one bidirectional video display interface operatively coupled to the ROIC, the electronic device being configured to receive the image signal from the ROIC via the at least one bidirectional video display interface and send command data to the ROIC via the at least one bidirectional video display interface.

2. The infrared thermal imaging system of claim 1, wherein the command data comprises control information.

3. The infrared thermal imaging system of claim 1, wherein the command data further includes non-uniformity correction terms for correcting the output signal of the FPA.

4. The infrared thermal imaging system of claim 3, wherein the non-uniformity correction terms are formatted into lines of video data and empty lines.

5. The infrared thermal imaging system of claim 4, wherein the command data is written into the empty lines.

6. The infrared thermal imaging system of claim 5, wherein the empty lines include horizontal blanking lines and wherein the command data is written into the horizontal blanking lines.

7. The infrared thermal imaging system of claim 6, wherein the output signal of the FPA includes an analog signal, and wherein the ROIC includes an analog-to-digital converter configured to convert the analog signal into a digital video signal.

8. The infrared thermal imaging system of claim 1, wherein the electronic device is a microcontroller.

9. A method of operating an infrared thermal imaging system having a focal plane array (FPA) of infrared detectors, read out integrated circuitry (ROIC) operatively coupled to the FPA, and an electronic device including at least one bidirectional video display interface operatively coupled to the ROIC, the method comprising:

generating, with the FPA of infrared detectors, an output signal in response to infrared radiation impinging thereupon;

receiving the output signal with the ROIC;

generating, with the ROIC, an image signal based on the output signal;

sending command data from the electronic device to the ROIC via the at least one bidirectional video display interface; and sending the image signal from the ROIC to the electronic device via the at least one bidirectional video display interface.

10. The method of claim 9, wherein the command data comprises control information.

11. The method of claim 9, wherein the command data further comprises non-uniformity correction terms for correcting an output signal of the FPA.

12. The method of claim 11, further comprising formatting the non-uniformity correction terms into lines of video data and empty lines.

13. The method of claim 12, further comprising writing the command data into the empty lines.

14. The method of claim 13, wherein the empty lines include horizontal blanking lines, and the method further comprising writing the command data into the horizontal blanking lines.

15. The method of claim 14, wherein the output signal of the FPA includes an analog signal, and wherein the method further comprises:

converting, by the ROIC, the analog signal into a digital video signal; and receiving, by the electronic device, the digital video signal via the at least one bidirectional video display interface.

* * * * *